(12) United States Patent
Lee et al.

(10) Patent No.: US 12,542,809 B2
(45) Date of Patent: Feb. 3, 2026

(54) APPARATUS AND METHOD FOR SCHEMING MODEL FOR DETECTING SECURE SHELL COMMUNICATION

(71) Applicant: SAMSUNG SDS CO., LTD., Seoul (KR)

(72) Inventors: Jun-Won Lee, Seoul (KR); Min-Jae Kim, Seoul (KR); Seung-Rok Lee, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 805 days.

(21) Appl. No.: 17/837,707

(22) Filed: Jun. 10, 2022

(65) Prior Publication Data
US 2023/0060853 A1 Mar. 2, 2023

(30) Foreign Application Priority Data
Aug. 23, 2021 (KR) ........................ 10-2021-0111039

(51) Int. Cl.
| | | |
|---|---|---|
| *H04L 29/06* | (2006.01) | |
| *G06N 5/01* | (2023.01) | |
| *H04L 9/40* | (2022.01) | |
| *H04L 41/16* | (2022.01) | |
| *H04L 67/02* | (2022.01) | |

(52) U.S. Cl.
CPC ............. *H04L 63/168* (2013.01); *G06N 5/01* (2023.01); *H04L 41/16* (2013.01); *H04L 63/0281* (2013.01); *H04L 67/02* (2013.01)

(58) Field of Classification Search
CPC ... H04L 63/168; H04L 41/16; H04L 63/0281; H04L 67/02; H04L 63/1425; H04L 43/04; G06N 5/01; G06N 20/20; G06N 20/00
See application file for complete search history.

(56) References Cited

U.S. PATENT DOCUMENTS 9,516,053 B1 * 12/2016 Muddu .............. G06F 16/9024
10,154,051 B2 * 12/2018 Sofka ..................... G06N 3/044
(Continued)

OTHER PUBLICATIONS

Alshammari, Riyad, et al., "Machine Learning Based Encrypted Traffic Classification: Identifying SSH and Skype", IEEE Symposium on Computational Intelligence for Security and Defense Applications, IEEE, 2009, (9 Pages in English).
(Continued)

*Primary Examiner* — Harunur Rashid
(74) *Attorney, Agent, or Firm* — NSIP Law (57) ABSTRACT

A method for scheming a model for detecting SSH communication according to an embodiment includes collecting a training dataset including a plurality of network session logs from a web proxy, generating a plurality of preprocessed log information based on a plurality of original datasets included in each of the plurality of network session logs, training, in a first algorithm-based first initial model and a second algorithm-based second initial model for detecting a log corresponding to SSH communication from network session logs, the first initial model and the second initial model based on the plurality of preprocessed log information, and using a new dataset as input to the trained first initial model and the trained second initial model and scheming a final model based on a detection result of the trained first initial model and a detection result of the trained second initial model.

12 Claims, 6 Drawing Sheets

(56) References Cited

U.S. PATENT DOCUMENTS

| | | | | |
|---|---|---|---|---|
| 2014/0165207 | A1* | 6/2014 | Engel | H04L 41/142 |
| | | | | 726/25 |
| 2018/0063168 | A1* | 3/2018 | Sofka | G06N 3/044 |
| 2018/0337831 | A1* | 11/2018 | Grill | H04W 12/37 |
| 2019/0372947 | A1* | 12/2019 | Penar | G06N 3/08 |

OTHER PUBLICATIONS

Almubayed, Alaeddin, et al., "A Model for Detecting Tor Encrypted Traffic using Supervised Machine Learning", International Journal of Computer Network and Information Security, Jun. 2015, (15 Pages in English).

Vinayakumar, R., et al., "Secure Shell (SSH) Traffic Analysis with Flow Based Features Using Shallow and Deep Networks", 2017 International Conference on Advances in Computing, Communications and Informatics (ICACCI), IEEE, 2017, (8 Pages in English).

Soleymanpour, Shiva, et al., "CSCNN: Cost-Sensitive Convolutional Neural Network for Encrypted Traffic Classification", Neural Processing Letters, Jun. 17, 2021, (27 Pages in English).

Korean Office Action Issued on Oct. 28, 2024, in Counterpart Korean Patent Application No. 10-2021-0111039 (6 Pages in English, 6 Pages in Korean).

\* cited by examiner

300 if $D_{RandomForest} = SSH$ then
    $D_{Hybrid} \leftarrow SSH$
else
    if $D_{DecisionTtee} = SSH$ and $no\_url = 1$ then
        $D_{Hybrid} \leftarrow SSH$
    else
        $D_{Hybrid} \leftarrow D_{RandomForest}$
    end
end

APPARATUS AND METHOD FOR SCHEMING MODEL FOR DETECTING SECURE SHELL COMMUNICATION

CROSS-REFERENCE TO RELATED APPLICATION AND CLAIM OF PRIORITY

This application claims the benefit under 35 USC § 119 of Korean Patent Application No. 10-2021-0111039, filed on Aug. 23, 2021, in the Korean Intellectual Property Office, the entire disclosure of which is incorporated herein by reference for all purposes.

BACKGROUND

1. Field

The disclosed embodiments relate to a machine learning-based technology for detecting secure shell (SSH) communication using a session log.

2. Description of Related Art

The SSH communication is a communication in which data transmitted between a client and a server is encrypted, and has safety and security advantages. However, since SSH communication is sometimes used for hacking or information leakage that bypasses a communication port, it is necessary to detect SSH communication between the client and the server in order to provide a more secure communication service.

However, in the past, since a large amount of network packets had to be analyzed to detect SSH communication, there was a limitation in that excessive traffic occurred in this process and a lot of time and computing resources were consumed.

Therefore, a method for detecting SSH communication by using a session log of a network instead of analyzing a large number of network packets is considered, but since port information in the session log is used, there is a problem in that it becomes difficult to detect SSH communication smoothly if an SSH server bypasses or falsifies the communication port used for SSH communication.

SUMMARY

The disclosed embodiments are intended to provide a means capable of smoothly detecting SSH communication even when a communication port used for SSH communication is changed, while saving time and computer resources.

An apparatus for scheming a model for detecting SSH communication according to an embodiment includes a log collector configured to collect a training dataset including a plurality of network session logs from a web proxy, a preprocessor configured to generate a plurality of preprocessed log information based on a plurality of original datasets included in each of the plurality of network session logs, an initial model trainer configured to train, in a first algorithm-based first initial model and a second algorithm-based second initial model for detecting a log corresponding to SSH communication among the plurality of is network session logs, the first initial model and the second initial model based on the plurality of preprocessed log information, and a final model scheming unit configured to use a new dataset including a plurality of separate network session logs as input to the trained first initial model and the trained second initial model and scheme a final model based on a detection result of the trained first initial model and a detection result of the trained second initial model.

The log collector may be configured to collect the training dataset including a plurality of HTTP CONNECT logs from the web proxy.

The preprocessor may be configured to assign a label indicating a communication type corresponding to the network session log to each network session log in which at least one of target port information and user agent information among the plurality of original datasets satisfies a preset condition.

The preprocessor may be configured to generate at least one preprocessed log information for each network session log by performing cross-analysis with information of other items in the same network session log, or performing cross-analysis with information of the same items in other network session logs using information of at least some items of the plurality of original datasets.

The first initial model may be a model in which parameters in the model are updated through machine learning based on a decision tree algorithm, and the second initial model may be a model in which parameters in the model are updated through machine learning based on a random forest algorithm.

The first initial model may be configured to detect the log corresponding to SSH communication from among the plurality of network session logs through a plurality of levels, but classify the log based on information of some items of the plurality of preprocessed log information for each level.

The final model scheming unit may be configured to scheme the final model by reflecting a classification result at a first level of the first initial model and a detection result of the first initial model in a detection result of the second initial model.

The final model scheming unit may be configured to scheme the final model so as to cause the final model to detect the network session log as the log corresponding to SSH communication when the second initial model detects the input network session log as the log corresponding to SSH communication, and scheme the final model so as to cause the final model to detect the network session log as the log corresponding to SSH communication if a classification result at a first level of the first initial model satisfies a preset condition and at the same time the first initial model detects the network session log as the log corresponding to SSH communication when the second initial model detects the network session log as a log that does not correspond to SSH communication.

A method for scheming a model for detecting secure shell communication according to another embodiment includes collecting a training dataset including a plurality of network session logs from a web proxy, generating a plurality of preprocessed log information based on a plurality of original datasets included in each of the plurality of network session logs, training, in a first algorithm-based first initial model and a second algorithm-based second initial model for detecting a log corresponding to SSH communication among the plurality of network session logs, the first initial model and the second initial model based on the plurality of preprocessed log information, and using a new dataset including a plurality of separate network session logs as input to the trained first initial model and the trained second initial model and scheming a final model based on a detection result of the trained first initial model and a detection result of the trained second initial model.

In the collecting, the training dataset including a plurality of HTTP CONNECT logs may be collected from the web proxy.

In the generating of the plurality of preprocessed log information, a label indicating a communication type corresponding to the network session log may be assigned to each network session log in which at least one of target port information and user agent information among the plurality of original datasets satisfies a preset condition.

In the generating of the plurality of preprocessed log information, at least one preprocessed log information may be generated for each network session log by performing cross-analysis with information of other items in the same network session log, or performing cross-analysis with information of the same items in other network session logs using information of at least some items of the plurality of original datasets.

The first initial model may be a model in which parameters in the model are updated through machine learning based on a decision tree algorithm, and the second initial model may be a model in which parameters in the model are updated through machine learning based on a random forest algorithm.

The first initial model may be configured to detect the log corresponding to SSH communication from among the plurality of network session logs through a plurality of levels, but classify the log based on information of some items of the plurality of preprocessed log information for each level.

In the scheming of the final model, the final model may be schemed by reflecting a classification result at a first level of the first initial model and a detection result of the first initial model in a detection result of the second initial model.

In the scheming of the final model, the final model may be schemed so as to cause the final model to detect the network session log as the log corresponding to SSH communication when the second initial model detects the input network session log as the log corresponding to SSH communication, and if a classification result at a first level of the first initial model satisfies a preset condition and at the same time the first initial model detects the network session log as the log corresponding to SSH communication when the second initial model detects the network session log as a log that does not correspond to SSH communication, the final model may be schemed so as to cause the final model to detect the network session log as the log corresponding to SSH communication.

According to disclosed embodiments, by scheming a model to detect SSH communication using network session logs, the time and computing resources required for detecting SSH communication can be significantly saved compared to processing a large amount of network packet data.

Further, according to disclosed embodiments, by analyzing the received/transmitted byte size, communication time, and number of times of communication based on machine learning, SSH communication can be detected smoothly even if the SSH server bypasses or falsifies the communication port used for SSH communication.

DETAILED DESCRIPTION

Hereinafter, a specific embodiment will be described with reference to the drawings. The following detailed description is provided to aid in a comprehensive understanding of the methods, apparatus and/or systems described herein. However, this is illustrative only, and the disclosed embodiments are not limited thereto.

In describing the embodiments, when it is determined that a detailed description of related known technologies may unnecessarily obscure the subject matter of the present disclosure, a detailed description thereof will be omitted. In addition, terms to be described later are terms defined in consideration of functions in the disclosed embodiments, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, terms "transfer", "communication", "transmission", "reception", and other similar meanings of a signal or information refer to not only direct transmission of the signal or information from one component to another, but also transmission of the signal or information through another component.

In particular, to "transfer" or "transmit" a signal or information to a component indicates that the signal or information is "transferred" or "transmitted" to a final destination of the signal or information, and does not imply that the signal or information is "transferred" or "transmitted" to a direct destination. The same is true for "reception" of a signal or information. In addition, in this specification, when two or more pieces of data or information are "related", it means that when one piece of data (or information) is acquired, at least a part of the other pieces of data (or information) can be acquired on the basis thereof.

Further, terms such as first and second may be used to describe various components, but the components should not be limited by the terms. The above terms may be used for the purpose of distinguishing one component from another component.

For example, without departing from the scope of the present disclosure, a first component may be named as a second component, and similarly, the second component may also be referred to as the first component.

Figure 1:
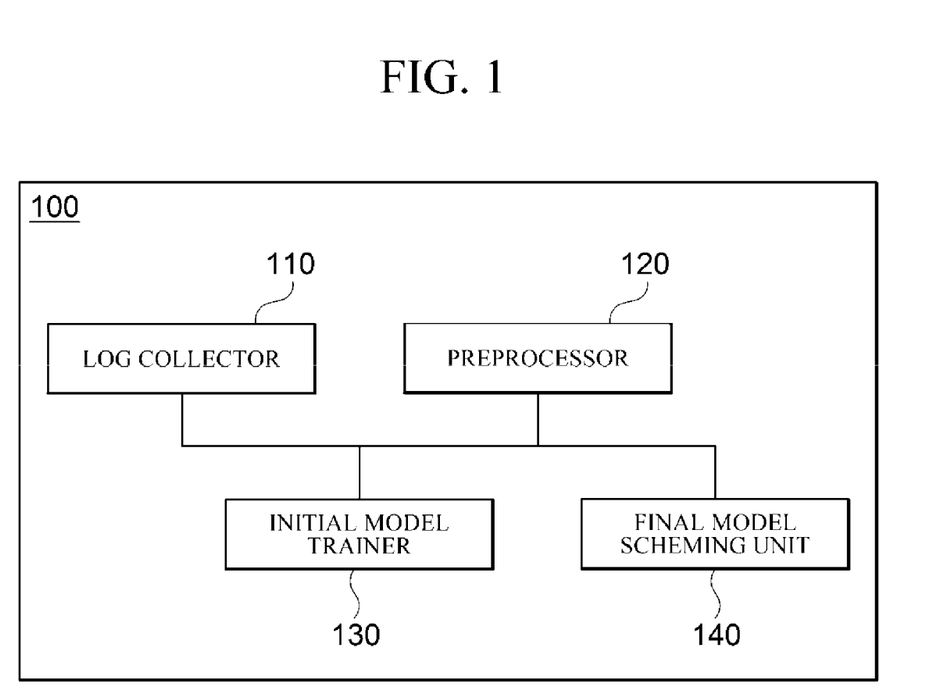
FIG. 1 is a block diagram for describing an apparatus for scheming a model for detecting SSH communication according to an embodiment.

FIG. 1 is a block diagram for describing an apparatus 100 for scheming a model for detecting SSH communication according to an embodiment.

As illustrated, the apparatus 100 for scheming a model for detecting SSH communication according to an embodiment includes a log collector 110, a preprocessor 120, an initial model trainer 130, and a final model scheming unit 140.

In the illustrated embodiment, configurations may respectively have different functions and capabilities other than those described below, and additional configurations may be included in addition to those described below.

In addition, in an embodiment, the log collector 110, the preprocessor 120, the initial model trainer 130, and the final model scheming unit 140 may be implemented using one or more physically separated devices, or implemented by one or more processors or a combination of one or more processors and software, and may not be clearly distinguished in a specific operation unlike the illustrated example.

The log collector unit 110 collects a training dataset including a plurality of network session logs from a web proxy.

In the following embodiment, the 'web proxy' may mean a server that relays a response and a request between a client and a server.

According to an embodiment, the log collector 110 may collect the training dataset including a plurality of HTTP CONNECT logs, as a type of network session log, from the web proxy.

Specifically, the HTTP CONNECT log collected by the log collector 110 may be a log recorded as a HTTP CONNECT method is executed. In this case, the HTTP CONNECT method may mean a method for bi-directionally connecting one device and another device according to a resource requested by the one device.

Of course, the log collector 110 may also collect logs corresponding to other types of HTTP methods other than the HTTP CONNECT method. However, since the HTTP CONNECT log corresponding to the HTTP CONNECT method may provide some information capable of identifying a type of application used for bidirectional connection (communication), it is more preferable to collect the HTTP CONNECT log.

The preprocessor 120 generates a plurality of preprocessed log information based on a plurality of original datasets included in each of the plurality of network session logs in is the training dataset.

In the following examples, 'pre-processing' is used as a concept including (i) a labeling task of assigning a label to each network session log for training a first initial model and a second initial model by using supervised learning, which will be described later, and (ii) a processing task of converting at least a part of each original dataset according to a specific criterion so that classification and detection through machine learning can be performed in a first initial model and a second initial model. However, it should be noted that 'pre-processing' in the document is not a concept limited only to the labeling task and the processing task, and may be used as a concept that further includes additional tasks depending on an embodiment.

(i) Labeling task: For example, the preprocessor 120 may assign a label indicating a communication type corresponding to the network session log to each network session log in which at least one of target port information and user agent information among the plurality of original datasets satisfies a preset condition.

According to an embodiment, the preprocessor 120 may determine whether the target port information in each original dataset corresponds to a port used for SSH communication for each of the plurality of original datasets, and assign a label indicating SSH communication to a network session log whose target port information corresponds to the port used for SSH communication as a result of determination.

According to another embodiment, the preprocessor 120 may determine whether a user agent is based on Web communication on the basis of the user agent information in each original dataset for each of the plurality of original datasets, and assign a label indicating Web communication to a network session log for the network session log for the user agent which is based on Web communication as a result of determination.

According to still another embodiment, the preprocessor 120 may determine whether the user agent is based on Mobile APP communication on the basis of the user agent information in each original dataset for each of the plurality of original datasets, and assign a label indicating Mobile APP communication to a network session log for the network session log for the user agent which is based on Mobile APP communication as a result of determination.

According to still another embodiment, the preprocessor 120 may determine whether a user agent is based on Dev APP communication on the basis of the user agent information in each original dataset for each of the plurality of original datasets, and assign a label indicating Web communication to a network session log for network session log for the user agent which is based on Dev APP communication as a result of determination.

Table 1 below shows an example in which the label is assigned to the network session log on the basis of target port information (cs_uri_port) and user agent information (cs_user_agent) among the original dataset.

TABLE 1

| Cs_uri_port | Cs_user_agent (Regular Exppression) | LABEL |
| --- | --- | --- |
| 22, 2022 | — | SSH |
| — | ^Mozilla/5.0* | Web |
| — | ^Apache-HttpClient/4* | Web |
| — | ^Dalvik/2.* | Mobile APP |
| — | ^aws-sdk-dotnet-45/.* | Dev APP |
| — | ^Zeplin/2.* | Dev APP |

For example, the preprocessor 120 may assign an SSH label indicating SSH communication to a network session log, whose target port information corresponds to a TCP port 22 normally used for SSH communication and a port (e.g., 2022) identified as a TCP port used for SSH communication within an environment where the log was collected.

Meanwhile, for example, if the user agent information in the original dataset of the log to which the SSH label is not assigned is 'Mozilla' or 'Apache-HttpClient', the preprocessor 120 may assign a Web label indicating Web communication to the corresponding network session log.

Further, for example, if the user agent information in the original dataset of the log to which the SSH label is not assigned is 'Dalvik', the preprocessor 120 may assign a Mobile APP label indicating Mobile APP communication to the corresponding network session log.

Further, for example, if the user agent information in the original dataset of the log to which the SSH label is not assigned is 'aws-sdk-dotnet(aws-sdk-.net)' or 'Zeplin', the preprocessor 120 may assign the Dev APP label indicating Dev APP communication to the corresponding network session log.

(ii) Processing task: For example, the preprocessor 120 may generate at least one preprocessed log information for each network session log by performing at least one of a binarization task on information of at least some items among the plurality of original datasets, a cross-analysis task with information of other items in the same network session log, a cross-analysis task with information of the same items in other network session logs, and a normalization task. However, the task performed by the preprocessor 120 is not limited to the type described above, and various additional tasks may be performed to generate preprocessed log information according to an embodiment.

According to one embodiment, the preprocessor 120 may perform the binarization task of dividing 24 hours into two types of time zones for communication time information among a plurality of original datasets and converting the corresponding communication time information into 0 or 1.

According to another embodiment, the preprocessor 120 may perform the binarization task of comparing a host address hosting client-server communication and a remote IP address of the host among the plurality of original datasets and generating a value of 0 or 1 depending on whether or not the host address and the remote IP address match.

According to still another embodiment, the preprocessor 120 may perform the cross-column analysis task of performing an operation on pieces of information of two or more items in the same network session log and generating one preprocessed log information.

According to still another embodiment, the preprocessor 120 may perform the cross-row analysis task of performing an operation on pieces of information of the same items in two or more different network session logs and generating one preprocessed log information.

According to still another embodiment, the preprocessor 120 may calculate a variance between values of information corresponding to each item for each item in the network session log, and perform a normalization task so that values of information corresponding to the item fall within a specific range.

Table 2 below shows an example in which preprocessed log information consisting of a total of 10 items (Business.time, log_time_taken, log_ratio_trans_receive, log_cs_byte, no_url, LABEL, log_count_connect_IP, log_count_total_connect, log_avg_count_connect, log_transmit_speed_BPS) is generated from the original dataset consisting of a total of 11 items (date_time, browse_time, c_ip, sc_byte, cs_byte, cs_host, r_ip, cs_uri_port, cs_user_agent, sc_category, cs_method).

TABLE 2

| Original Dataset | Preprocessed Dataset | Value description |
|---|---|---|
| date_time | Business.time (1 or 0) | 07:00~19:00 (1)20:00~06:00 (0) |
| browse_time | log_time_taken | total session time |
| c_ip | — | client ip address |
| sc_byte | log_ratio_trans_receive | send byte/receive byte |
| cs_byte | log_cs_byte | send byte |
| cs_host, r_ip | no_url (1 or 0) | if(cs_host=r_ip)then no_url←1 *If the communication has no url address, the value of no_url is '1' |
| cs_uri_portcs_user_agent | LABEL | Web, SSH, Mobile_APP, Dev_APP |
| sc_category | — | unknown destination ip has no category |
| cs_method | — | No info, appeared in the HTTP CONNECT |
| — | log_count_connect_IP | Number of c_ip connected to the same cs_host |
| — | log_count_total_connect | Number of connections to the same cs_host |
| — | log_avg_count_connect | Average number of connections per IP to the same cs_host |
| — | log_transmit_speed_BPS | Average transfer speed |

For example, the preprocessor 120 may set 1 as a value of an item 'Business.time' when a value of an item 'date_time' in the original dataset falls between 07:00 and 19:00, and set 0 as the value of the item 'Business.time' when the value of the item 'date_time' falls between 20:00 and 06:00 (binarization task).

In addition, for example, the preprocessor 120 may preprocess a value of a 'browse_time' item in the original dataset as a total session time based on Equation 1 below to generate a value of a 'log_time_taken' item.

$$\text{log\_time\_taken} = \text{Normalization}(\log(\text{browse\_time (msec)}*1000)) \quad \text{[Equation 1]}$$

Further, for example, the preprocessor 120 may preprocess a value of a 'cs_byte' item in the original dataset through Equation 2 below to generate a value of a 'log_cs_byte' item as a byte transmitted from the client to the server, and perform the cross-column analysis task through Equation 3 below based on a value of a 'sc_byte' item in the original dataset as a ratio of bytes received by the server from the client to generate a value of an item 'log_ratio_trans_receive' as a ratio of bytes transmitted to the client by the server to bytes received by the server from the client.

$$\text{log\_cs\_byte} = \text{Normalization}(\log(\text{cs\_byte})) \quad \text{[Equation 2]}$$

$$\text{log\_ratio\_trans\_receive} = \text{Normalization}(\log(\text{cs\_byte}/\text{sc\_byte})) \quad \text{[Equation 3]}$$

Further, for example, the preprocessor 120 may set 1 as a value of a 'no_url' item when the values of the 'cs_host' item and the 'r_ip' item in the original dataset match, and set 0 as the value of the 'no url' item when the values of the 'cs_host' item and the 'r_ip' item do is not match (binarization task).

Further, for example, the preprocessor 120 may perform the cross-row analysis through Equation 4 below to generate a value of a 'log count connect IP' item as the number of client IP addresses (c_ip) connected to the same destination address (cs_host)

$$\text{log\_count\_connect\_IP} = \text{Normalization (log (connected IP counts to the same cs\_host))} \quad \text{[Equation 4]}$$

Further, for example, the preprocessor 120 may perform the cross-row analysis through Equation 5 below to generate a value of a 'log_count_total_connect' item as the number of connections to the same destination address.

$$\text{log\_count\_total\_connect} = \text{Normalization (log (connection counts to the same cs\_host))} \quad \text{[Equation 5]}$$

Further, for example, the preprocessor 120 may perform the cross-row analysis through Equation 6 below to generate a value of a 'log_avg_count_connect' item as an average number of connections per IP to the same destination address.

$$\text{log\_avg\_count\_connect} = \text{Normalization (log (connection average per IP to the same cs\_host))} \quad \text{[Equation 6]}$$

Further, for example, the preprocessor 120 may perform the cross-row analysis through Equation 7 below to generate a value of a 'log_transmit_speed_BPS' item as the average transmission speed.

$$\text{log\_transmit\_speed\_BPS} = \text{Normalization(log (cs\_byte/(browse\_time (msec)*1000)))} \quad \text{[Equation 7]}$$

The initial model trainer 130 trains the first initial model and the second initial model based on the plurality of preprocessed log information generated by the preprocessor 120. In this case, the first initial model and the second initial model are models that detect logs corresponding to SSH communication from the network session log, and the first initial model is based on a first algorithm, and the second initial model is based on a second algorithm.

According to an embodiment, the first initial model and the second initial model are models in each of which parameters in the model are updated through machine learning. The initial model trainer 130 may take the label assigned to each network session log among the plurality of preprocessed log information generated by the preprocessor 120 as ground truth, cause the first initial model and the second initial model to detect whether each network session log is a log corresponding to SSH communication based on the remaining nine pieces of pre-processed log information, and update the parameters of each model through supervised learning by comparing the detection result of each model with ground truth.

Specifically, the initial model trainer 130 may calculate an 'error rate' in which ground truth and the detection result of each model do not match for each preset training epoch, and train each model until the error rate is less than or equal to a preset threshold. In this case, training may be performed based on a loss function defined based on a difference between ground truth and the detection result of each model, and the initial model trainer 130 may train each model in a direction in which a value of the loss function decreases.

According to an embodiment, the first initial model may be based on a decision tree algorithm, and the second initial model may be based on a random forest algorithm.

According to one embodiment, the first initial model may detect the log corresponding to SSH communication among the plurality of network session logs through a plurality of levels, and perform classification of a log based on information of some items among the plurality of preprocessed log information for each level. In this regard, description will be made later with reference to FIG. 2.

Figure 2:
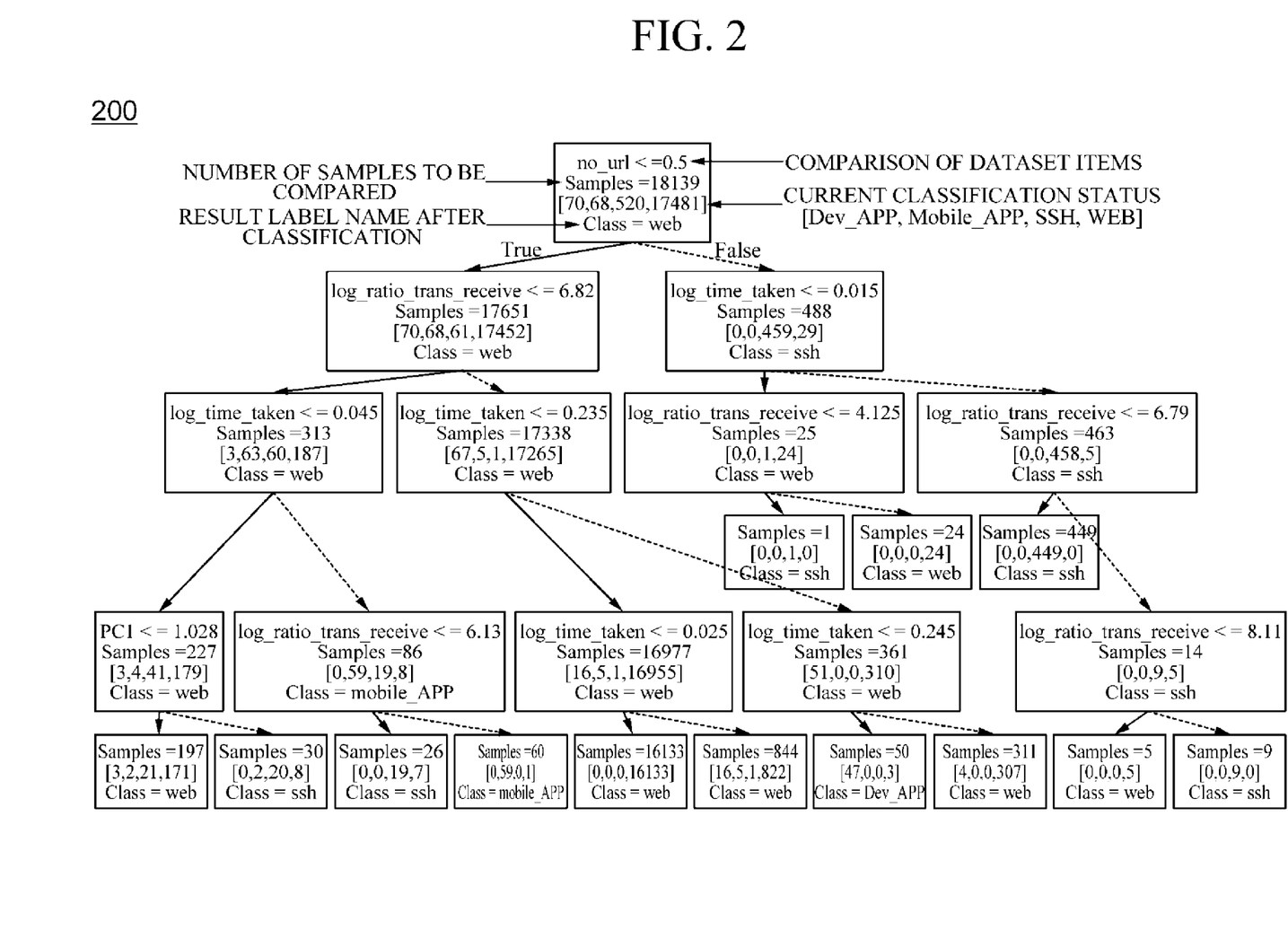
FIG. 2 is an exemplary diagram illustrating a classification and detection process in a decision tree algorithm-based first initial model according to an embodiment.

FIG. 2 is an exemplary diagram 200 illustrating a classification and detection process in the decision tree algorithm-based first initial model according to an embodiment.

In FIG. 2, a process of detecting the log corresponding to SSH communication by the first initial model performing classification of the log for each of four levels based on information of a specific item, and finally identifying a label of the log is illustrated.

Referring to FIG. 2, at the uppermost level 1, for a total of 18,139 network session logs, classification is performed based on whether a value of the 'no url' item is 0.5 or less.

In this case, the 'current classification status' means a pre-assigned label, 70 logs are logs assigned Dev-APP label, 68 logs are logs assigned Mobile APP label, 520 logs are logs assigned SSH label, and 17481 logs are logs assigned Web label. The 'result label name after classification' means a result classified when a criterion is satisfied in the first initial model.

At the level 2 below the level 1, classification is performed, based on whether a value of the 'log_ratio_trans_receive' item is 6.82 or less, for 17651 logs that satisfy the criterion at the level 1, and classification is performed, based on whether a value of the 'log_time_taken' item is 0.015 or less, for 488 logs that do not satisfy the criterion at the level 1.

At the level 3 below the level 2, classification is performed, based on whether a value of the 'log_time_taken' item is 0.045 or less, for 313 logs that satisfy both the criteria at the level 1 and level 2, and classification is performed, based on whether a value of the 'log_time_taken' item is 0.235 or less, for 17,338 logs that satisfy the criterion at the level 1 but do not satisfy the criterion at the level 2. On the other hand, classification is performed, based on whether a value of the 'log_ratio_trans_receive' item is 4.125 or less, for 25 logs that do not satisfy the criterion at the level 1 but satisfy the criterion at level the 2, and classification is performed, based on whether a value of the 'log_ratio_trans_receive' item is 6.79 or less, for 463 logs that do not satisfy both the criterion at the level 1 and the criterion at the level 2.

As illustrated in FIG. 2, as a result of classification of 25 logs at the level 3, it can be seen that one log was detected as a log corresponding to SSH communication, and 24 logs were detected as logs corresponding to Web communication. In addition, as a result of classification of 463 logs, it can be seen that 449 logs were detected as logs corresponding to SSH communication. These three cases correspond to the classification results up to the level 3, but since the classified logs are classified as a single type of label (detected as a log corresponding to a single type of communication), classification of the logs at level 4 is not performed.

Meanwhile, at the 4 level below the level 3, classification is performed, based on whether a value of a 'PC1' item is 1.028 or less, for 227 logs that satisfy all the criteria at the levels 1, 2, and 3, and classification is performed, based on whether a value of the 'log_ratio_trans_receive' item is 6.13 or less, for 86 logs that satisfy the criteria at the first and second levels but do not satisfy the criteria at the third level. In this case, 'PC1' means an integrated feature transcribed from the original dataset through principal component analysis (PCA).

In addition, at level 4, classification is performed, based on whether a value of the 'log_time_taken' item is 0.025 or less, for 16977 logs that satisfy the criteria at the levels 1 and 3 but do not satisfy the criterion at the level 2, and classification is performed, based on whether a value of the 'log_time_taken' item is 0.245 or less, for 361 logs that satisfy the criterion at the level 1 but do not satisfy the criteria at the levels 2 and 3. In addition, classification is performed, based on whether a value of the 'log_ratio_trans_receive' item is 8.11 or less, for 14 logs that do not satisfy all the criteria at the levels 1 to 3.

As a result of classification up to the level 4, a total of 18,139 logs are classified among the logs that have the same result for satisfaction/dissatisfaction with respect to the four criteria. In this case, the pre-assigned labels may not be the same even among the logs classified together in some cases. For example, 197 logs that satisfy all the criteria at the levels 1 to 3 consist of 3 logs corresponding to Dev APP communication, 2 logs corresponding to Mobile APP communication, 21 logs corresponding to SSH communication, and 171 logs corresponding to Web communication. In this case, the first initial model detects 197 logs as logs corresponding to Web communication according to labels of 171 logs occupying the largest proportion.

According to an embodiment, as parameters are updated while machine learning is in progress, at least one reference value among reference values at the levels 1 to 4 may be changed.

Referring back to FIG. 1, the second initial model according to an embodiment may generate a detection result by averaging the results detected from a plurality of decision trees. For example, the second initial model may be a model that generates a detection result of the second initial model itself by averaging detection results of respective trees including 100 decision trees.

The final model scheming unit 140 uses a new dataset including a plurality of separate network session logs as input to the first initial model and second initial model trained by the initial model trainer 130 and schemes a final model based on a detection result of the trained first initial model and a detection result of the trained second initial model.

According to an embodiment, the final model scheming unit 140 may scheme the final model by reflecting (i) the classification result at the first level of the first initial model and (ii) the detection result of the first initial model in the detection result of the second initial model.

This is to scheme the final model to complement the disadvantages of the respective models while having both the advantage of the first initial model and the advantage of the second initial model. Specifically, although the first initial model may detect SSH communication that cannot be detected by the second initial model, there is a disadvantage in that a false positive rate (FPR) is relatively higher. Accordingly, the final model scheming unit 140 aims to scheme a final model with a lower false positive rate than the first initial model while better detecting the SSH communication that cannot be detected by the second initial model. Hereinafter, an algorithm for scheming the final model will be described with reference to FIG. 3.

Figure 3:
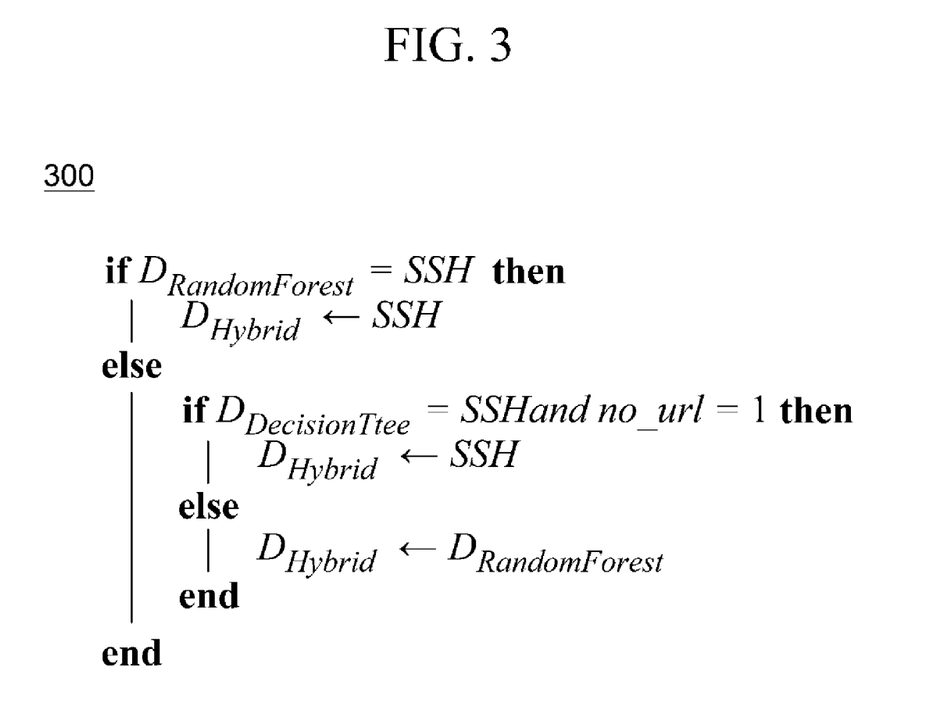
FIG. 3 is an exemplary diagram of pseudo code representing an algorithm for scheming a final model according to an embodiment.

FIG. 3 is an exemplary diagram 300 of pseudo code representing an algorithm for scheming a final model according to an embodiment.

For convenience of description, in FIG. 3, the first initial model is referred to as $D_{DecisionTree}$, the second initial model is referred to as $D_{RandomForest}$, and the final model is referred to as $D_{Hybrid}$.

Referring to FIG. 3, when the second initial model detects the input network session log as the log corresponding to SSH communication, the final model design unit 140 may scheme the final model so that the final model detects the corresponding network session log as the log corresponding to SSH communication.

Meanwhile, if a classification result at a first level of the first initial model satisfies a preset condition and at the same time the first initial model detects the network session log as a log corresponding to SSH communication when the second initial model detects the network session log as a log that does not correspond to SSH communication, the final model scheming unit may scheme the final model so as to cause the final model to detect the network session log as the log corresponding to SSH communication. In this regard, although the 'preset condition' is illustrated as 'no url=1' in FIG. 3, this is exemplary, and conditions related to various additional log information as well as the preprocessed log information described in Table 2 may be set depending on an embodiment.

Figure 4:
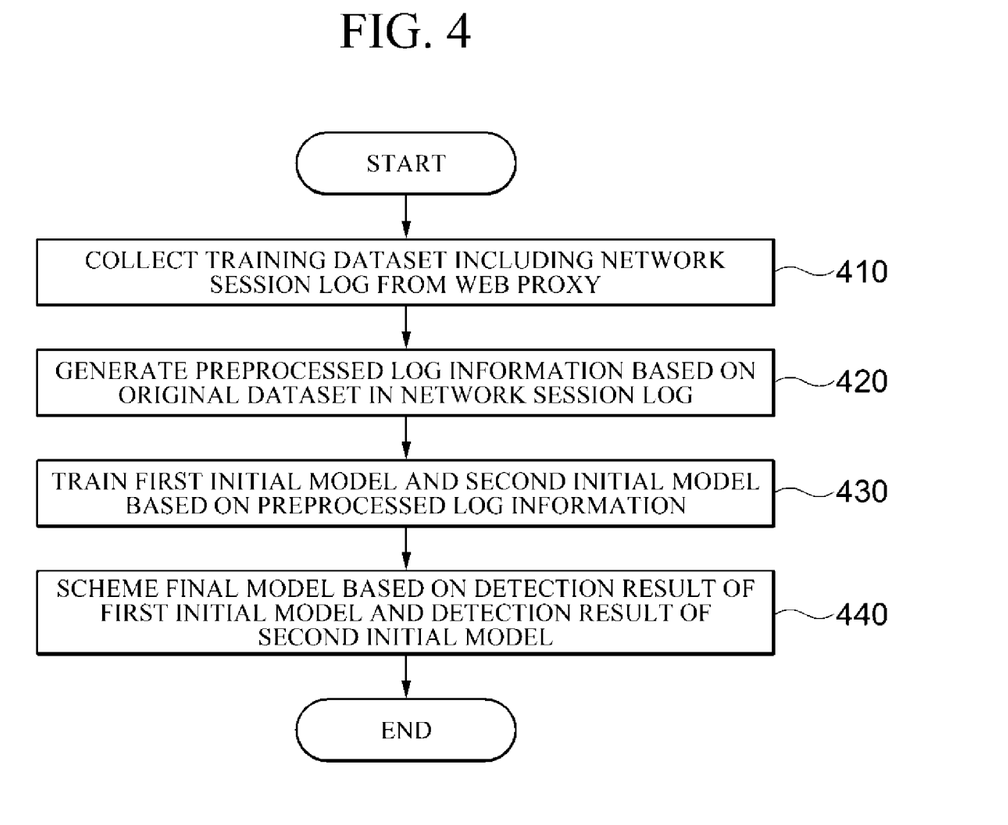
FIG. 4 is a flowchart illustrating a method for scheming a model for detecting SSH communication according to an embodiment.

FIG. 4 is a flowchart illustrating a method for scheming a model for detecting SSH communication according to an embodiment.

The method illustrated in FIG. 4 may be performed, for example, by the apparatus 100 for scheming a model for detecting SSH communication described above.

First, the apparatus 100 for scheming a model for detecting SSH communication collects a training dataset including a plurality of network session logs from the web proxy (410).

After that, the apparatus 100 for scheming a model for detecting SSH communication generates a plurality of preprocessed log information based on a plurality of original datasets included in each of the plurality of network session logs (420).

After that, the apparatus 100 for scheming a model for detecting SSH communication trains the first algorithm-based first initial model and the second algorithm-based second initial model on the basis of the number of generated preprocessed log information (430). In this case, each of the first initial model and the second initial model is a model for detecting the log corresponding to SSH communication from the network session log.

After that, the apparatus 100 for scheming a model for detecting SSH communication uses a new dataset including a plurality of separate network session logs as input to the first initial model and the second initial model trained through step 430 and schemes a final model based on a detection result of the trained first initial model and a detection result of the trained second initial model (440).

In the illustrated flowchart, although the method has been described by dividing the method into a plurality of steps, at least some steps may be performed in a different order, performed together in combination with other steps, omitted, performed by dividing the steps into sub-steps, or performed by being added with one or more steps (not illustrated).

Figure 5:
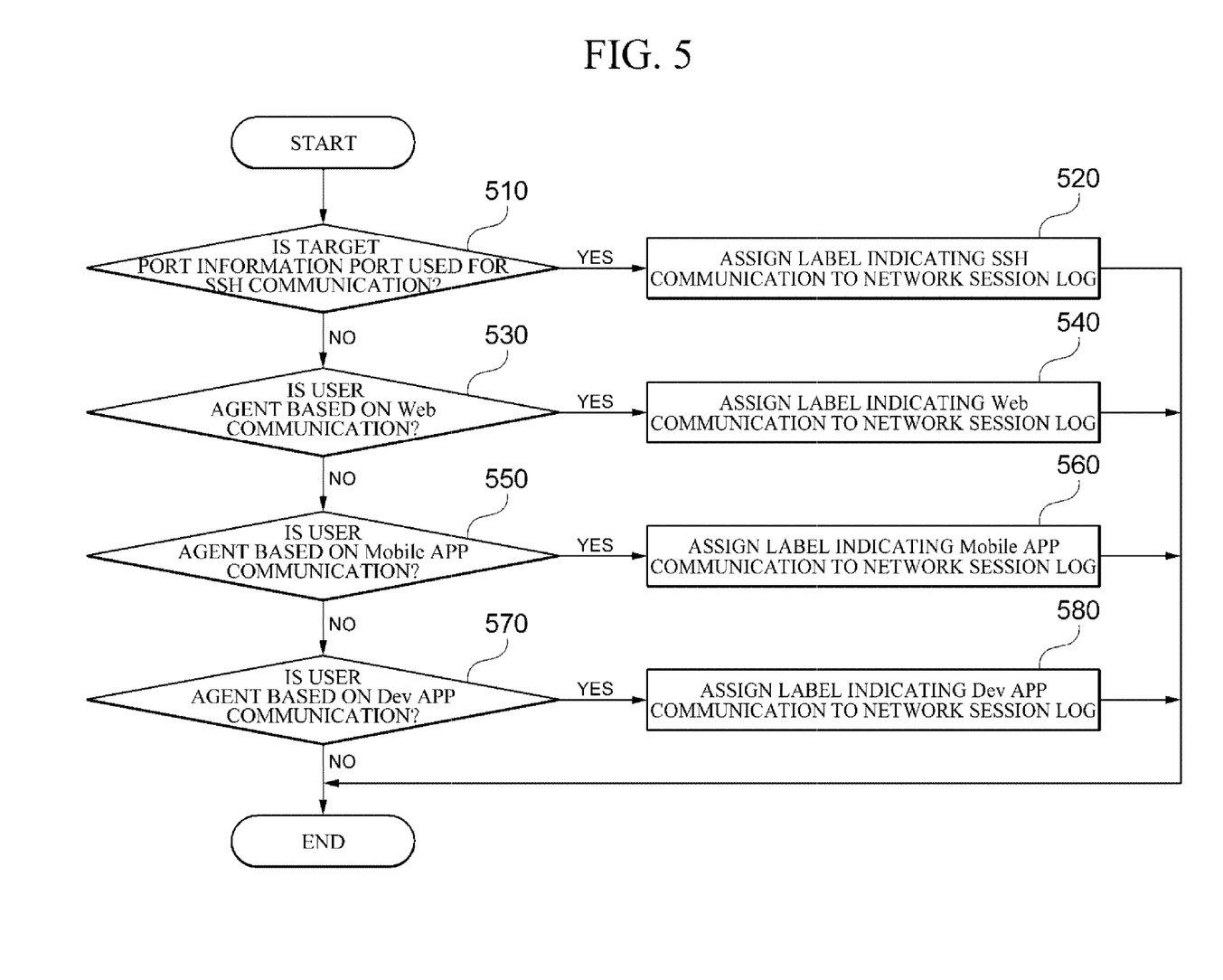
FIG. 5 is a flowchart for describing in detail a labeling method for supervised learning in step 420.

FIG. 5 is a flowchart for describing in detail a labeling method for supervised learning in step 420.

The method illustrated in FIG. 5 may be performed, for example, by the apparatus 100 for scheming a model for detecting SSH communication described above.

First, the apparatus 100 for scheming a model for detecting SSH communication determines whether target port information in each original dataset corresponds to a port used for SSH communication, for each of the plurality of original datasets (510).

After that, the apparatus 100 for scheming a model for detecting SSH communication assign a label indicating SSH communication to a network session log, for the network session log whose target port information corresponds to the port used for SSH communication (520).

Meanwhile, the apparatus 100 for scheming a model for detecting SSH communication determines whether a user agent is based on Web communication on the basis of the user agent information in the original dataset of the network session log, for the network session log whose target port information does not correspond to the port used for SSH communication (530).

After that, the apparatus 100 for scheming a model for detecting SSH communication assigns a label indicating Web communication to a network session log, for network session log for the user agent which is based on Web communication (540).

On the other hand, the apparatus 100 for scheming a model for detecting SSH communication determines whether the user agent is based on Mobile APP communication for the user agent which is not based on Web communication (550).

After that, the apparatus 100 for scheming a model for detecting SSH communication assigns a label indicating Mobile APP communication to a network session log, for the network session log for the user agent which is based on Mobile APP communication (560).

On the other hand, the apparatus 100 for scheming a model for detecting SSH communication determines whether the user agent is based on Dev APP communication for the user agent which is not based on Web communication and Mobile APP communication (570).

After that, the apparatus 100 for scheming a model for detecting SSH communication assigns a label indicating Dev APP communication to a network session log, for the network session log for the user agent which is based on Dev APP communication (580).

In the illustrated flowchart, although the method has been described by dividing the method into a plurality of steps, at least some steps may be performed in a different order, performed together in combination with other steps, omitted, performed by dividing the steps into sub-steps, or performed by being added with one or more steps (not illustrated).

Figure 6:
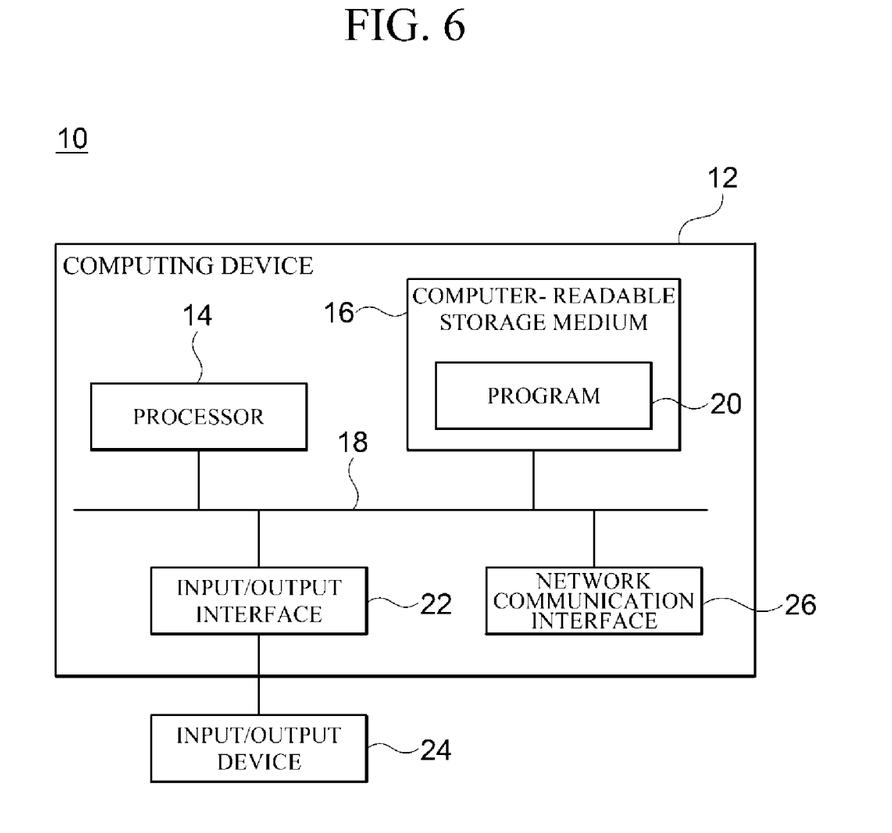
FIG. 6 is a block diagram illustratively describing a computing environment including a computing device according to an embodiment.

FIG. 6 is a block diagram illustratively describing a computing environment 10 including a computing device according to an embodiment. In the illustrated embodiment, respective components may have different functions and capabilities other than those described below, and may include additional components in addition to those described below.

The illustrated computing environment 10 includes a computing device 12. In an embodiment, the computing device 12 may be the apparatus 100 for scheming a model for detecting SSH communication.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

The embodiments described above may be implemented by a hardware component, a software component, and/or a combination of a hardware component and a software component. For example, the apparatuses, methods, and components described in the embodiments may be implemented using one or more general purpose or special purpose computers, such as, for example, a processor, controller, arithmetic logic unit (ALU), digital signal processor, microcomputer, field programmable gate array (FPGA), programmable logic unit (PLU), microprocessor, or any other device capable of executing and responding to an instruction. A processing device may execute an operating system (OS) and one or more software applications running on the operating system. The processing device may also access, store, manipulate, process, and generate data in response to execution of software. For convenience of understanding, although a description that one processing device is used may have been made, a person of ordinary skill in the art will recognize that the processing device may include a plurality of processing elements and/or a plurality of types of processing elements. For example, the processing device may include a plurality of processors, or one processor and one controller. Other processing configurations, such as parallel processors, are also possible.

Software may include a computer program, code, instruction, or combinations of one or more of these, which may configure the processing device to operate as desired, or instruct the processing device independently or collectively. Software and/or data may be permanently or temporarily embodied in any tangible machine, component, physical equipment, virtual equipment, computer storage medium or device, or signal wave being transmitted, in order to be interpreted by the processing device or to provide instructions or data to the processing device. Software may be distributed over networked computer systems and stored or executed in a distributed manner. Software and data may be stored in one or more computer-readable recording media.

Although representative embodiments of the present disclosure have been described in detail, s person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. An apparatus for scheming a model for detecting secure shell (SSH) communication, the apparatus comprising:
one or more processors configured to:
collect a training dataset including a plurality of network session logs from a web proxy;
generate a plurality of preprocessed log information based on a plurality of original datasets included in each of the plurality of network session logs;
train, in a first algorithm-based first initial model and a second algorithm-based second initial model for detecting a log corresponding to SSH communication from network session logs, the first initial model and the second initial model based on the plurality of preprocessed log information;
use a new dataset including a plurality of separate network session logs as input to the trained first initial model and the trained second initial model and scheme a final model based on a detection result of the trained first initial model and a detection result of the trained second initial model;
scheme the final model by reflecting a classification result at a first level of the first initial model and a detection result of the first initial model in a detection result of the second initial model;
scheme the final model so as to cause the final model to detect the network session log as the log corresponding to SSH communication when the second initial model detects the input network session log as a log corresponding to SSH communication; and
scheme the final model so as to cause the final model to detect the network session log as the log corresponding to SSH communication if a classification result at a first level of the first initial model satisfies a preset condition and at the same time the first initial model detects the network session log as the log corresponding to SSH communication when the second initial model detects the network session log as a log that does not correspond to SSH communication.

2. The apparatus of claim 1, wherein the one or more processors are configured to collect the training dataset including a plurality of HTTP CONNECT logs from the web proxy.

3. The apparatus of claim 1, wherein the one or more processors are configured to assign a label indicating a communication type corresponding to the network session a label indicating a communication type corresponding to the network session log to each network session log in which at least one of target port information and user agent information among the plurality of original datasets satisfies a preset condition.

4. The apparatus of claim 1, wherein the one or more processors are configured to generate at least one preprocessed log information for each network session log by performing, for information of at least some items among the plurality of original datasets, at least one of a binarization task, a cross-analysis task with information of other items in the same network session log, a cross-analysis task with information of the same items in other network session logs, and a normalization task.

5. The apparatus of claim 1, wherein the first initial model is a model in which parameters in the model are updated through machine learning based on a decision tree algorithm; and
the second initial model is a model in which parameters in the model are updated through machine learning based on a random forest algorithm.

6. The apparatus of claim 1, wherein the one or more processors are configured to detect the log corresponding to SSH communication from among the plurality of network session logs through a plurality of levels, but classify the log based on information of some items of the plurality of preprocessed log information for each level.

7. A method for scheming a model for detecting secure shell (SSH) communication, the method comprising:
collecting a training dataset including a plurality of network session logs from a web proxy;
generating a plurality of preprocessed log information based on a plurality of original datasets included in each of the plurality of network session logs;
training, in a first algorithm-based first initial model and a second algorithm-based second initial model for detecting a log corresponding to SSH communication from network session logs, the first initial model and the second initial model based on the plurality of preprocessed log information; and
using a new dataset including a plurality of separate network session logs as input to the trained first initial model and the trained second initial model and scheming a final model based on a detection result of the trained first initial model and a detection result of the trained second initial model,
wherein in the scheming of the final model, the final model is schemed by reflecting a classification result at a first level of the first initial model and a detection result of the first initial model in a detection result of the second initial model, and
wherein, in the scheming of the final model, the final model is schemed so as to cause the final model to detect the network session log as the log corresponding to SSH communication when the second initial model detects the input network session log as the log corresponding to SSH communication, and is schemed so as to cause the final model to detect the network session log as the log corresponding to SSH communication if a class cation result at a first level of the first initial model satisfies a preset condition and at the same time the first initial model detects the network session log as the log corresponding to SSH communication when the second initial model detects the network session log as a log that does not correspond to SSH communication.

8. The method of claim 7, wherein, in the collecting, the training dataset including a plurality of HTTP CONNECT logs is collected from the web proxy.

9. The method of claim 7, wherein, in the generating of the plurality of preprocessed log information, a label indicating a communication type corresponding to the network session log is assigned to each network session log in which at least one of target port information and user agent information among the plurality of original datasets satisfies a preset condition.

10. The method of claim 7, wherein, in the generating of the plurality of preprocessed log information, at least one preprocessed log information is generated for each network session log by performing, for information of at least some items among the plurality of original datasets, at least one of a binarization task, a cross-analysis task with information of other items in the same network session log, a cross-analysis task with information of the same items in other network session logs, and a normalization task.

11. The method of claim 7, wherein the first initial model is a model in which parameters in the model are updated through machine learning based on a decision tree algorithm; and the second initial model is a model in which parameters in the model are updated through machine learning based on a random forest algorithm.

12. The method of claim 7, wherein the first initial model is configured to detect the log corresponding to SSH communication from among the plurality of network session logs through a plurality of levels, but classify the log based on information of some items of the plurality of preprocessed log information for each level.

\* \* \* \* \*